US009607144B1

(12) United States Patent
Bird et al.

(10) Patent No.: US 9,607,144 B1
(45) Date of Patent: *Mar. 28, 2017

(54) USER ACTIVITY MODELLING, MONITORING, AND REPORTING FRAMEWORK

(71) Applicant: International Business Machines Corporation, Armonk, NY (US)

(72) Inventors: William A. Bird, Fredericton (CA); Rory F. Bray, Ferdericton (CA); Jason D. Keirstead, Fredericton (CA); Dwight E. Spencer, Douglas (CA); Ben A. Wuest, Fredericton (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/953,831

(22) Filed: Nov. 30, 2015

(51) Int. Cl.
*G06F 12/16* (2006.01)
*G06F 21/50* (2013.01)
*H04L 29/06* (2006.01)

(52) U.S. Cl.
CPC .......... *G06F 21/50* (2013.01); *H04L 63/1408* (2013.01); *H04L 63/1441* (2013.01); *G06F 2221/034* (2013.01)

(58) Field of Classification Search
CPC .............. G06F 21/50; G06F 2221/034; H04L 63/1408; H04L 63/1441
See application file for complete search history.

(56) References Cited

U.S. PATENT DOCUMENTS

| 5,485,409 | A | 1/1996 | Gupta et al. | |
|---|---|---|---|---|
| 7,284,274 | B1 | 10/2007 | Walls et al. | |
| 8,510,388 | B2 * | 8/2013 | Taylor | H04L 51/04 709/206 |
| 8,776,168 | B1 | 7/2014 | Gibson et al. | |
| 9,009,837 | B2 | 4/2015 | Nunez Di Croce | |
| 9,032,533 | B2 | 5/2015 | Bennett et al. | |
| 2013/0097701 | A1 * | 4/2013 | Moyle | G06F 21/552 726/22 |
| 2014/0195530 | A1 * | 7/2014 | Milton | G06Q 30/02 707/734 |
| 2015/0373039 | A1 * | 12/2015 | Wang | H04L 43/10 726/23 |

OTHER PUBLICATIONS

List of IBM Patents or Applications Treated as Related.

* cited by examiner

*Primary Examiner* — Mohammed Waliullah
(74) *Attorney, Agent, or Firm* — Terrile, Cannatti, Chambers & Holland, LLP; Stephen A. Terrile

(57) ABSTRACT

A method, system and computer-usable medium are disclosed for identifying risk within an information technology (IT) environment, comprising: analyzing characteristics of a user accessing a system within an IT environment; associating a risk profile with the user based upon the characteristics of the user; determining when the user accesses a system within the IT environment; maintaining a user risk profile record of all systems within the IT environment accessed by the user, the user risk profile record continuing to be associated with the system after access by the user ceases; and, identifying a risk level for all systems within the IT environment based upon the user risk profile record.

12 Claims, 3 Drawing Sheets

USER ACTIVITY MODELLING, MONITORING, AND REPORTING FRAMEWORK

BACKGROUND OF THE INVENTION

Field of the Invention

The present invention relates in general to the field of computers and similar technologies, and in particular to software utilized in this field. Still more particularly, it relates to a method, system and computer-usable medium for identifying risk within an information technology (IT) environment.

Description of the Related Art

Organizations today are exposed to a greater volume and variety of attacks than in the past. Advanced attackers are clever and patient, leaving just a whisper of their presence. Accordingly, it is desirable to provide security functionality which helps to detect and defend against threats by applying sophisticated analytics to more types of data. It is also desirable to provide such security functionality which identifies high-priority incidents that might otherwise get lost in the noise of the overall operation of a large scale information processing environment.

It is known to provide security functionality to IT environments via security intelligence platforms which integrate security information and event management (SIEM), log management, anomaly detection, vulnerability management, risk management and incident forensics into a unified solution. Many known security intelligence platforms which include SIEM monitor user activity on the network to efficiently react in real time to suspicious user activity.

SUMMARY OF THE INVENTION

A method, system and computer-usable medium are disclosed for identifying risk within an information technology (IT) environment, comprising: analyzing characteristics of a user accessing a system within an IT environment; associating a risk profile with the user based upon the characteristics of the user; determining when the user accesses a system within the IT environment; maintaining a user risk profile record of all systems within the IT environment accessed by the user, the user risk profile record continuing to be associated with the system after access by the user ceases; and, identifying a risk level for all systems within the IT environment based upon the user risk profile record.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
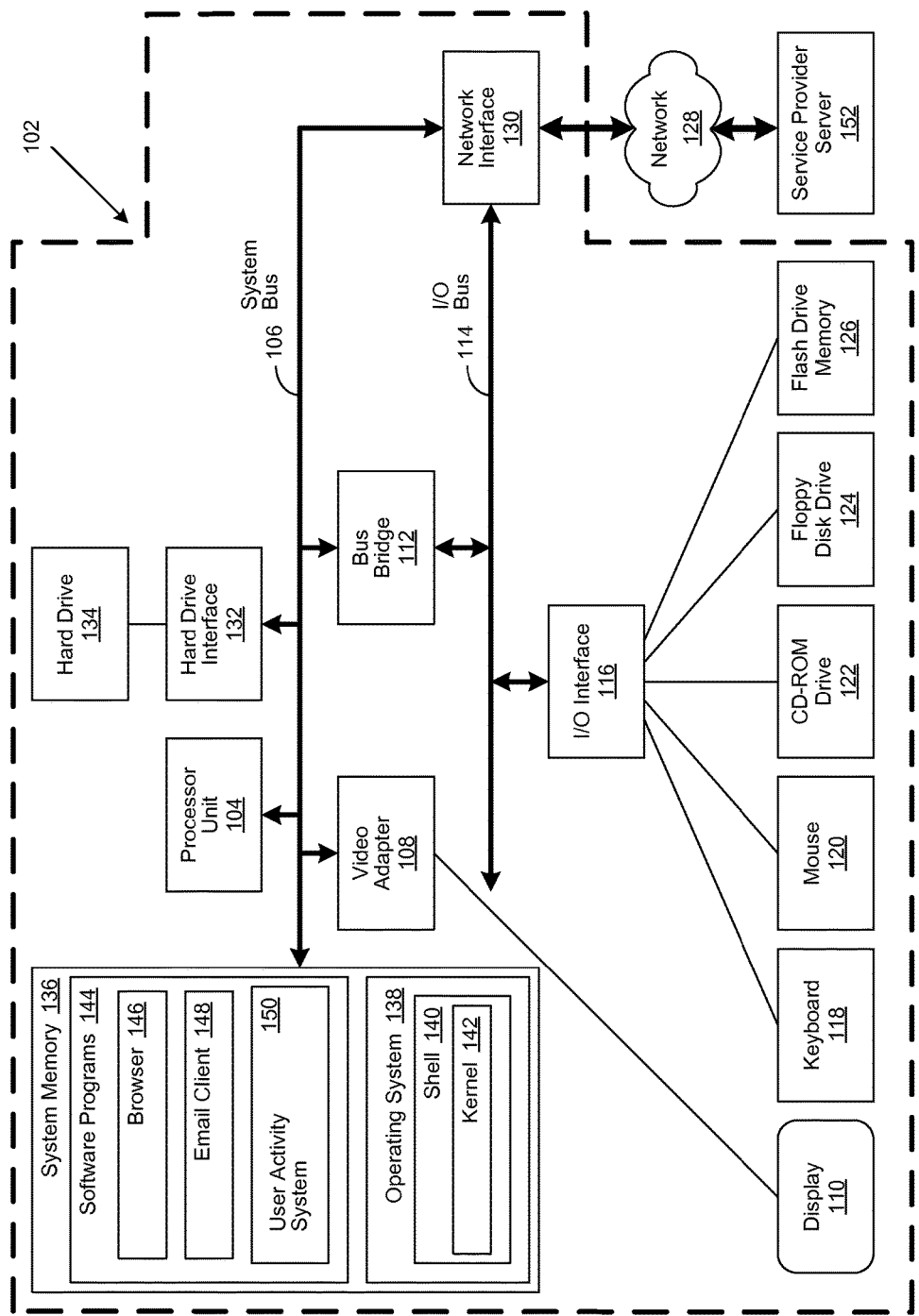
FIG. 1 depicts an exemplary client computer in which the present invention may be implemented.

A method, system and computer-usable medium are disclosed for providing a security intelligence platform with a user activity modelling, monitoring and reporting framework. Such a user activity modelling, monitoring and reporting framework presents a framework for modelling, reporting and analysis of user activity with respect to any user related activity in the data (i.e. browsing, system access and financial transaction events). In the framework, user activities are modelled through the collection of data from user activity data sources and systems. In various embodiments, activity behavioral groups are constructed on a global (i.e., entire user population) and individual (i.e., behavior with regard to each user). Additionally, in various embodiments, clustering attributes are dynamic and depend on the activity (e.g., browsing habits, system access behavior etc.). Additionally, in various embodiments, specific suspicious activity is identified based on external threat feeds and analysis. Additionally, in various embodiments, information is presented based upon the analysis to the organization and individual users with regard to risk assessments, observed suspicious activities and general education of what is affecting risk with respect to the organization and individual users.

Various aspects of the present disclosure include a recognition that many known security intelligence systems do not provide an integrated approach to modelling user activity and organizational behavior patterns, notifying users individually of potential risky activity, receiving feedback from users about their actions, and automatically assigning risk to users and the entire organization. Additionally, various aspects of the present disclosure include a recognition that it is desirable to provide these types of user analysis for one or more of a plurality of reasons. More specifically, these types of user analysis can aid in understanding user behaviors and increasing the ability to detect potentially malicious/suspicious activity on the network. Additionally, these types of user analysis can aid in providing an organization and individuals a view and assessment of risk. Additionally, these types of user analysis can aid in providing an organization a feedback loop/return on Investment (ROI) measurement when instituting user education, policies, and campaigns with respect to increasing the security awareness of users. Additionally, these types of user analysis can aid in increasing the organizations security awareness.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management. Software programs 144 may include a browser 146 and email client 148. Browser 146 includes program modules and instructions enabling a World Wide Web (WWW) client (i.e., client computer 102) to send and receive network messages to the Internet using Hyper-Text Transfer Protocol (HTTP) messaging, thus enabling communication with service provider server 152. In various embodiments, software programs 144 may also include a user activity system 150. In these and other embodiments, the user activity system 150 includes code for implementing the processes described hereinbelow. In one embodiment, client computer 102 is able to download the user activity system 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit, scope and intent of the present invention.

Figure 2:
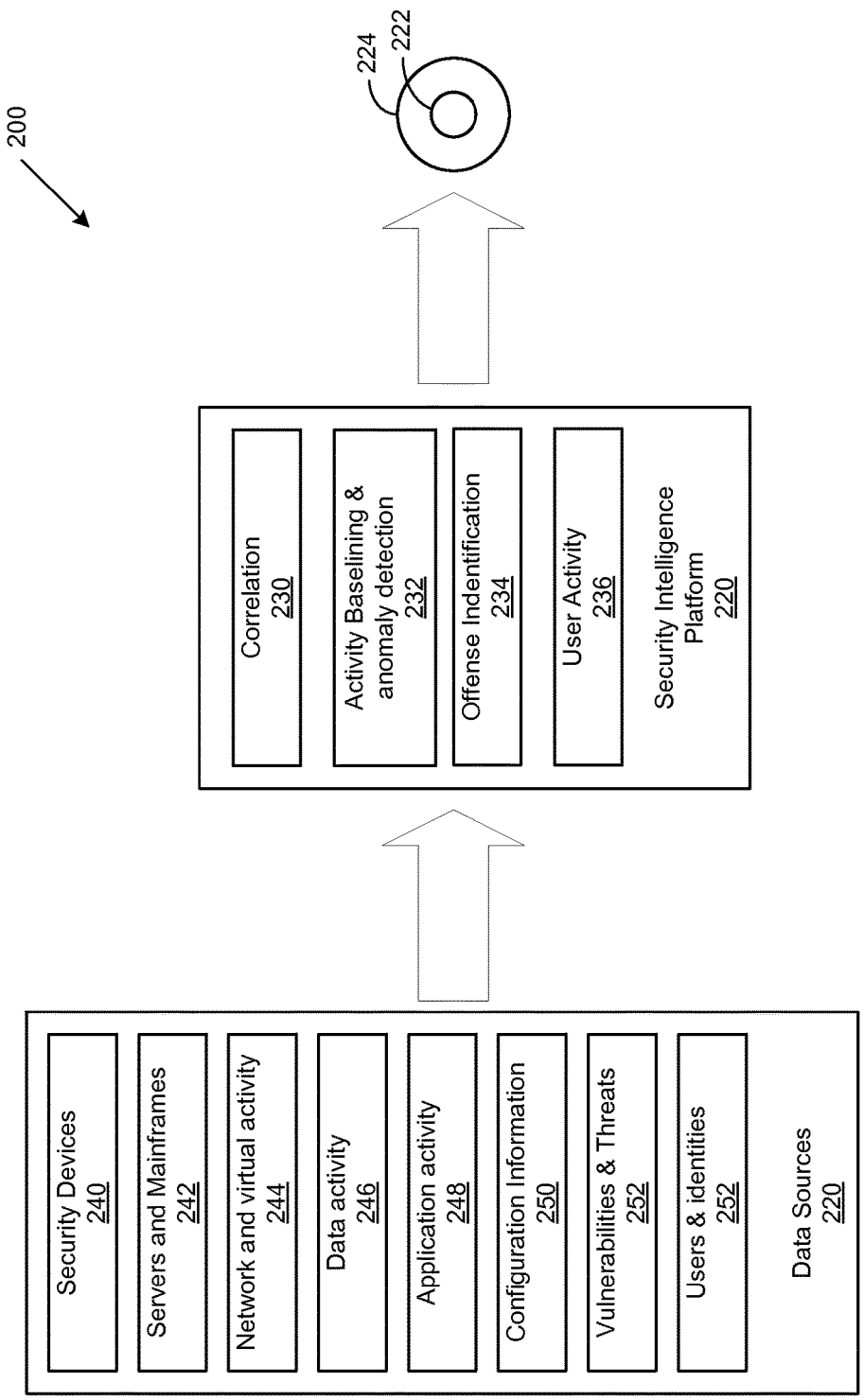
FIG. 2 is a simplified block diagram of a security intelligence platform.

FIG. 2 shows a simplified block diagram of a security intelligence environment 200 which includes a security intelligence platform 210 in accordance with various aspects of the invention. The security intelligence platform 210 integrates security information and event management (SIEM), log management, anomaly detection, vulnerability management, risk management and incident forensics into a unified solution. By using intelligence, integration and automation to provide 360-degree security insight, the security intelligence platform 210 delivers threat detection, ease of use and lower total cost of ownership. The security intelligence platform 210 uses intelligence, integration and automation to deliver security and compliance functionality.

The security intelligence platform 210 receives information from one or more of a plurality of data sources 220 and performs one or more of correlation operations, activity baselining and anomaly detection operations and offense identification operations to provide an identification of a true offense 222 as well as identification of suspected intendents 224. In certain embodiments, the security intelligence platform 210 includes one or more of an integrated family of modules that can help detect threats that otherwise would be missed. For example, in certain embodiments, the family of modules can include a correlation module 230 for performing the correlation operations, an activity baselining and anomaly detection module 232 for performing the activity baselining and anomaly detection operations, an offence identification module 234 for performing the offence identification operation and a user activity module 236 for performing a user activity operation. In various embodiments, the correlation operation includes one or more of logs/events analysis, flow analysis, IP reputation analysis and geographic location analysis. In various embodiments, the activity baselining and anomaly detection operation includes one or more of user activity analysis, database activity analysis, application activity analysis and network activity analysis. In various embodiments, the offense identification operation includes one or more of credibility analysis, severity analysis and relevance analysis. In various embodiments, the user activity operation includes one or more of user activity modelling, user activity monitoring and user activity reporting. In various embodiments, the user activity system 150 performs one or more of the functions of the user activity module 236.

Such user activity modelling, monitoring and reporting operation provide modelling, reporting and analysis of user activity with respect to any user related activity in the data (i.e. browsing, system access and financial transaction events). User activities are modelled through the collection of data from user activity data sources and systems. In various embodiments, activity behavioral groups are constructed on a global (i.e., entire user population) and individual (i.e., behavior with regard to each user). Additionally, in various embodiments, clustering attributes are dynamic and depend on the activity (e.g., browsing habits, system access behavior etc.). Additionally, in various embodiments, specific suspicious activity is identified based on external threat feeds and analysis. Additionally, in various embodiments, information is presented based upon the analysis to the organization and individual users with regard to risk assessments, observed suspicious activities and general education of what is affecting risk with respect to the organization and individual users.

The plurality of data sources 220 can include one or more of security devices 240, servers and mainframes 242, network and virtual activity data sources 244, data activity data sources 246, application activity data sources 248, configuration information data sources 250, vulnerabilities and threats information data sources 252 as well as users and identities data sources 254.

The security intelligence platform 210 helps detect and defend against threats by applying sophisticated analytics to the data received from the plurality of data sources. In doing so, the security intelligence platform 210 helps identify high-priority incidents that might otherwise get lost in the noise of the operation of a large scale information processing environment. The security intelligence platform 200 uses some or all of the integrated family of modules to solve a number of business issues including: consolidating data silos into one integrated solution; identifying insider theft and fraud; managing vulnerabilities, configurations, compliance and risks; conducting forensic investigations of incidents and offenses; and, addressing regulatory mandates.

In various embodiments, the security intelligence platform 210 provides a plurality of functions. For example, in certain embodiments, the security intelligence platforms consolidates data silos from a plurality of data sources. More specifically, while a wealth of information exists within organizations operating large scale information processing systems such as log, network flow and business process data, this information is often held in discrete data silos. The security intelligence platform 210 converges network, security and operations views into a unified and flexible solution. The security intelligence platform breaks down the walls between silos by correlating logs with network flows and a multitude of other data, presenting virtually all relevant information on a single screen. Such a correlation helps enable superior threat detection and a much richer view of enterprise activity.

Additionally, in various embodiments, the security intelligence platform performs an insider fraud detection operation. Some of the gravest threats to an organization can come from the inside the organization, yet organizations often lack the intelligence needed to detect malicious insiders or outside parties that have compromised user accounts. By combining user and application monitoring with application-layer network visibility, organizations can better detect meaningful deviations from normal activity, helping to stop an attack before it completes.

Additionally, in various embodiments, the security intelligence platform 210 predicts and remediates risk and vulnerabilities. Security, network and infrastructure teams strive to manage risk by identifying vulnerabilities and prioritizing remediation before a breach occurs. The security intelligence platform 210 integrates risk, configuration and vulnerability management with SIEM capabilities, including correlation and network flow analytics, to help provide better insight into critical vulnerabilities. As a result, organizations can remediate risks more effectively and efficiently.

Additionally, in various embodiments, the security intelligence platform 210 can conduct forensics analysis. In certain embodiments, the security intelligence platform 210 includes integrated incident forensics helps IT security teams reduce the time spent investigating security incidents, and eliminates the need for specialized training. The security intelligence platform 210 expands security data searches to include full packet captures and digitally stored text, voice, and image documents. The security intelligence platform helps present clarity around what happened when, who was involved, and what data was accessed or transferred in a security incident. As a result, the security intelligence platform 210 helps remediate a network breach and can help prevent it from succeeding again.

Additionally, in various embodiments, the security intelligence platform 210 addresses regulatory compliance mandates. Many organizations wrestle with passing compliance audits while having to perform data collection, monitoring and reporting with increasingly limited resources. To automate and simplify compliance tasks, the security intelligence platform 210 provides collection, correlation and reporting on compliance-related activity, backed by numerous out-of-the-box report templates.

The security intelligence platform 210 leverages easier-to-use security analytics. More specifically, the security intelligence platform 210 provides a unified architecture for storing, correlating, querying and reporting on log, flow, vulnerability, and malevolent user and asset data. The security intelligence platform 210 combines sophisticated analytics with out-of-the-box rules, reports and dashboards. While the platform is powerful and scalable for large corporations and major government agencies, the platform is also intuitive and flexible enough for small and midsize organizations. Users benefit from potentially faster time to value, lower cost of ownership, greater agility, and enhanced protection against security and compliance risks.

The security intelligence platform 210 provides advanced intelligence. More specifically, by analyzing more types of data and using more analytics techniques, the platform can often detect threats that might be missed by other solutions and help provide advanced network visibility.

The security intelligence platform 210 also provides advanced integration. Because the security intelligence platform includes a common application platform, database and user interface, the platform delivers massive log management scale without compromising the real-time intelligence of SIEM and network behavior analytics. It provides a common solution for all searching, correlation, anomaly detection and reporting functions. A single, intuitive user interface provides seamless access to all log management, flow analysis, incident management, configuration management, risk and vulnerability management, incident forensics, dashboard and reporting functions.

The security intelligence platform 210 also provides advanced automation. More specifically, the security intelligence platform 201 is simple to deploy and manage, offering extensive out-of-the-box integration modules and security intelligence content. By automating many asset discovery, data normalization and tuning functions, while providing out-of-the-box rules and reports, the security intelligence platform 210 is designed to reduce complexity of the operation of the platform.

Figure 3:
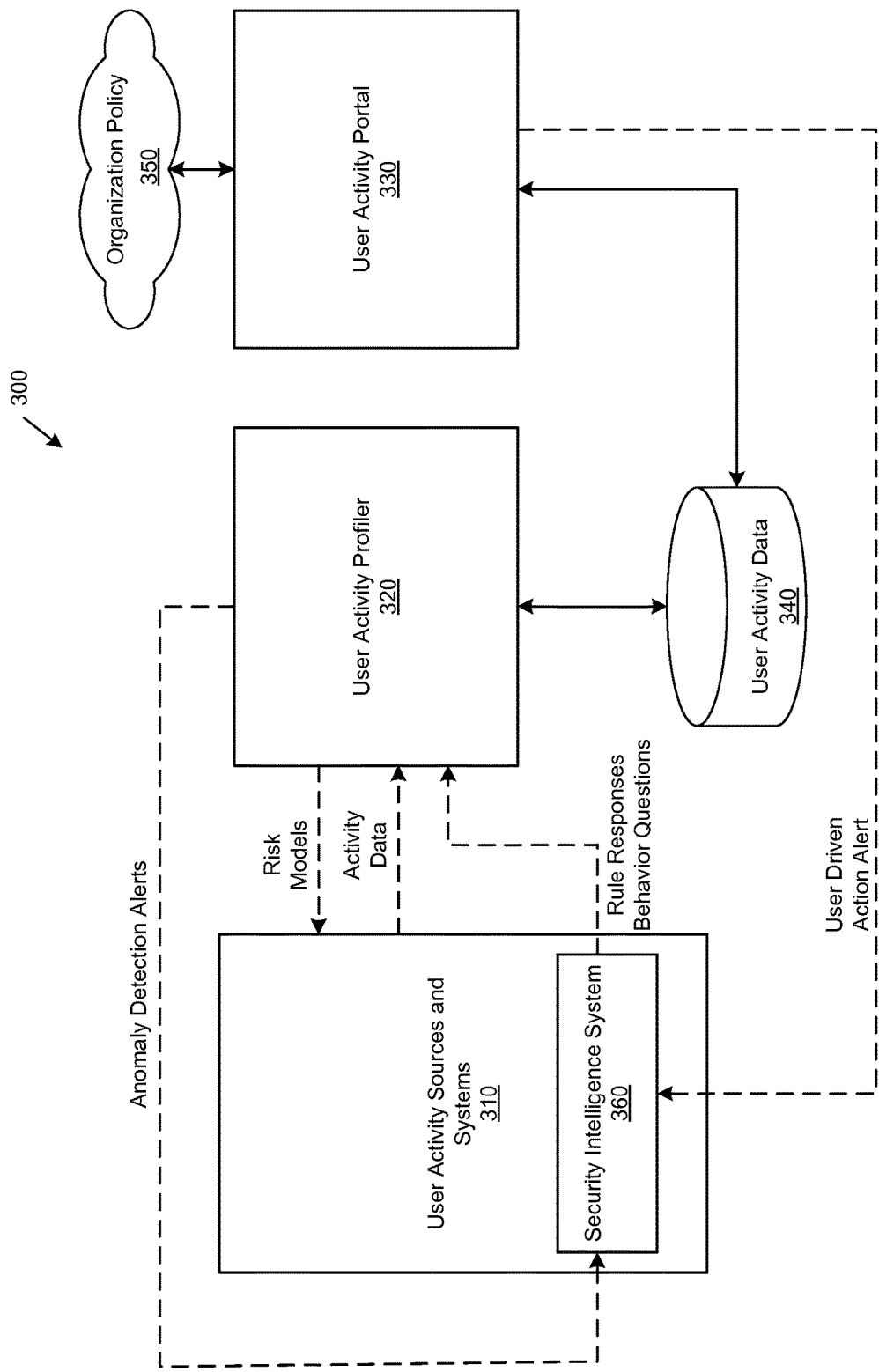
FIG. 3 is a generalized block diagram of a user activity modelling, monitoring and reporting framework of a security intelligence platform.

FIG. 3 is a generalized block diagram of a user activity framework 300 of a security intelligence platform. The user activity framework 300 provides a security intelligence platform with a user activity modelling, monitoring and reporting framework. Such a user activity modelling, monitoring and reporting framework presents a framework for modelling, reporting and analysis of user activity with respect to any user related activity in the data (i.e. browsing, system access and financial transaction events). In the framework, user activities are modelled through the collection of data from user activity data sources and systems. In various embodiments, activity behavioral groups are constructed on a global (i.e., entire user population) and individual (i.e., behavior with regard to each user). Additionally, in various embodiments, clustering attributes are dynamic and depend on the activity (e.g., browsing habits, system access behavior etc.). Additionally, in various embodiments, specific suspicious activity is identified based on external threat feeds and analysis. Additionally, in various embodiments, information is presented based upon the analysis to the organization and individual users with regard to risk assessments, observed suspicious activities and general education of what is affecting risk with respect to the organization and individual users.

More specifically, the user activity framework 300 includes user activity sources and systems 310, a user activity profiler 320, a user activity portal 330 as well as a user activity data repository 340 and organization policy information repository 350. A security intelligence system 360 is also included within the framework. It will be appreciated that the security intelligence system 360 may include some or all of the components of the security intelligence platform 210.

The user activity sources and systems 310 include any data sources or systems that may be of interest to the security intelligence platform 200. The data sources and systems feed user activity profiler information activity or context data. This context data provides information which can be important related to activities of a user.

In operation an important data source of the framework 300 is the security intelligence system 360. The security intelligence system 360 interacts with the various components of the framework and performs a plurality of functions for the framework. More specifically, the security intelligence system 360 feeds activity data (e.g., user events) to the user activity profiler 320. In various embodiments, the activity data is provided to the user activity profiler 320 via predefined user activity profiler application program interfaces (APIs) and/or via a real time data stream. Additionally, the security intelligence system 360 provides user context information to the user activity profiler 320. This user context information can include information regarding assets related to the user as well as any other useful relations associated with a particular user.

The security intelligence system 260 also drives interactive data to the user activity profiler 320 based on rules relating to real time activity of the user. For example, in certain embodiments the interactive data includes user activity questions or the like. The real time activity of the user can include for example, a user suddenly logging in from a geographic location that they never used before. Based upon such an activity the activity profiler 320 might cause the security intelligence system to generate a question to the user such as "did you log in from the geographic location at this time?" The interactive data to the user can include questions related to observed user activities as well as education for the user based upon the observed activities and how the observed activities might be related to a perceived security threat. The interactive data to the user can also include general notifications related to suspicious activities.

The security intelligence system 360 also receives alerts from the user activity profiler based upon the observed user activities. In certain embodiments, the alerts may be in the form of risk models to be used by the security intelligence system 260 when determining a level of risk associated with particular observed user behavior. The security intelligence system 360 may also receive alerts from the user activity portal 330 based upon user initiated feedback alerts. The security intelligence system 360 can also receive user risk data and risk information associated with objects that have relations to the user. In various embodiments, the objects may include other assets such as other information processing assets as well as associations with other users.

The user activity profiler 320 is the component of the framework 300 that collects data from the user activity data sources. The data from user activity data sources are stored within the user activity data repository 340. This data can include SEIM data as well as identity management data. The user activity profiler 320 then perform user activity analysis operations on this information. The analysis operations may be associated with a plurality of user activity analysis categories. More specifically, in certain embodiments the user activity analysis categories include an individual user activity analysis category. When performing an individual user activity analysis category type analysis operation, the user activity profiler 320 analyzes activities relating to activity that correspond to normal trends of like situated user, activities that correspond to risky behaviors of a user, activities that correspond to activity grouping of the user and activities that correspond to particular risk factors. For the purposes of this disclosure, an activity grouping describes how users with a given activity relates to an organizational group. For example, an activity grouping might be based upon database activity or online behavior. In certain embodiments, the risk factors may be adjusted according to the role of the user within the IT environment in which the security intelligence platform 200 is tasked with securing.

In certain embodiments, the user activity analysis categories include a group user analysis category. When performing a group user analysis category type analysis operation, the user activity profiler 320 profiles and clusters all users activities into groups to baseline the enterprises user activities.

From the group user analysis category type analysis operation, the user activity profiler 320 can generate a plurality of types of information. More specifically, when performing the group user analysis category type analysis operation, the user activity profiler 320 can generate alerts that can be provided to the security intelligence system 360. These alerts can be related to specific activities, activities that are different from the observed normal activities for that group of users; and/or any custom analysis injected into the user activity profiler 320. In various embodiments, the custom analysis can include clustering algorithms and/or statistical profiling on user behavior that may be injected based upon any desired alerts. Additionally, in certain embodiments, when performing the group user analysis category type analysis operation, the user activity profiler 320 can generate accumulated risk models to be consumed by any system associated with the platform 200. In certain embodiments, the accumulated risk modes are presented via the user activity portal 330. Additionally, in certain embodiments, when performing the group user analysis category type analysis operation, the user activity profiler 320 can generate interactive data relating to the group of users. The interactive data to the group of users can include questions related to observed user activities as well as education for the group of users based upon the observed activities and how the observed activities might be related to a perceived security threat. The interactive data to the group of users can also include general notifications related to suspicious activities.

The user activity portal 330 is the component of the framework 300 that interacts with the users of the framework 300. In certain embodiments, the user activity portal 330 includes an interactive reporting system. In various embodiments, the interactive reporting system can provide a plurality of interactive views. For example, in certain embodiments, the interactive views can include an individual user perspective view. The individual user perspective view can include information relating to an overall user risk assessment, education associated with the overall user risk assessment (e.g., what activities the user is performing and/or interacting with that effects the overall user risk assessment), user activity questions and alerts that are generated relating to the particular user activity. Examples of information obtained from user activity questions can include determining whether a user was logged into a specific server on a specific time, did a user access a particular file location from a particular system, did a user have trouble logging in from a particular location at a particular time, and/or was a user actually attempting to log in from a particular geographic location at a particular time. In various embodiments, the user has an ability to interact with the user activity portal 330 such as by asking to be notified of alerts through email and providing feedback to the security intelligence system 360 by answering activity questions.

Additionally, in certain embodiments, the interactive views can include a global perspective view, which may also be considered an administrative perspective view. The global perspective view allows for a higher level view of user activities and user group analysis to gain perspective of overall organizational behavior with respect to users. In various embodiments, the global perspective view provides information regarding predominant user groups with respect to various types of activity. In various embodiments, the global perspective view provides information regarding security conscious and/or unconscious users within the organization being secured as well as relations to assets and other context data. This information can be tailored to take into account user information such as IT roles within the organization. In various embodiments, the global perspective view provides information regarding an overall user risk assessment. In various embodiments, this risk assessment can also include some estimation of trend. In certain embodiments, an estimation of trend can include a time series of an estimated risk on a given user over time. Providing an estimation of trend allows the organization being secured to receive feedback on whether policies or activities that have put in place over a certain amount of time (e.g., over the last month etc.) are making a difference to the security of the organization.

Such a user activity framework provides a plurality of advantages in the field of security intelligence platforms. More specifically, such a framework provides an increased user security awareness (which may also referred to as a security intelligence quotient). An automated system that can provide users notifications, education and feedback about their activities can potentially dramatically increase the security awareness of organizational users and in turn reduces security incidents. Additionally, such a user activity framework an organizational measurement of security policies, campaigns and education. Additionally, because such a user activity framework allows risks associated with user activity to be assessed on a regular basis based on all the activities and data sources, organizations are able to better understand the effect of policies etc. implemented to increase the security awareness of the organization.

Although the present invention has been described in detail, it should be understood that various changes, substitutions and alterations can be made hereto without departing from the spirit and scope of the invention as defined by the appended claims.

What is claimed is:

1. A system comprising:
   a processor;
   a data bus coupled to the processor; and
   a computer-usable medium embodying computer program code, the computer-usable medium being coupled to the data bus, the computer program code used for identifying risk within an information technology (IT) environment and comprising instructions executable by the processor and configured for:
   collecting data regarding user activities from a plurality of user activity data sources, the collecting data being provided to a user activity profiler from a security intelligence system via predefined user activity profile application program interfaces;

storing the data regarding the user activities within a user activity data repository;

analyzing characteristics of a user accessing a system within an IT environment, the IT environment comprising a plurality of systems, the characteristics of the user being related to the user activities and information relating to activity behavioral groups based upon the user activities;

associating a risk profile with the user based upon the characteristics of the user;

determining when the user accesses a system within the IT environment;

maintaining a user risk profile record of all systems of the plurality of systems within the IT environment accessed by the user, the user risk profile record continuing to be associated with the user after access by the user ceases; and, identifying a risk level for the plurality of systems within the IT environment based upon the user risk profile record; and wherein specific suspicious user activity is identified based on external threat feeds and analysis; and, information regarding the specific suspicious user activity is presented to an organization and to individual users with regard to risk assessments, observed suspicious activities and general education of what is affecting risk with respect to the organization and individual users.

2. The system of claim 1, wherein:
the analyzing characteristics of the user accessing the system comprise modelling the user activities via a collection of data from the plurality of user activity data sources.

3. The system of claim 1, wherein:
activity behavioral groups are constructed on a global perspective based upon the user activities of a plurality of users.

4. The system of claim 1, wherein:
activity behavioral groups are constructed on an individual perspective based upon user activities of a single user.

5. The system of claim 1, wherein:
user activity is associated with one or more user activity attributes, the user activity comprising browsing habits and system access behavior; and
user activities are dynamically clustered depending on a user activity.

6. A non-transitory, computer-readable storage medium embodying computer program code, the computer program code comprising computer executable instructions configured for:

collecting data regarding user activities from a plurality of user activity data sources, the collecting data being provided to a user activity profiler from a security intelligence system via predefined user activity profile application program interfaces;

storing the data regarding the user activities within a user activity data repository;

analyzing characteristics of a user accessing a system within an information technology (IT) environment, the IT environment comprising a plurality of systems, the characteristics of the user being related to the user activities and information relating to activity behavioral groups based upon the user activities;

associating a risk profile with the user based upon the characteristics of the user;

determining when the user accesses a system of the plurality of systems within the IT environment;

maintaining a user risk profile record of all systems within the IT environment accessed by the user, the user risk profile record continuing to be associated with the user after access by the user ceases; and, identifying a risk level for the plurality of systems within the IT environment based upon the user risk profile record; and wherein specific suspicious user activity is identified based on external threat feeds and analysis; and, information regarding the specific suspicious user activity is presented to an organization and to individual users with regard to risk assessments, observed suspicious activities and general education of what is affecting risk with respect to the organization and individual users.

7. The non-transitory, computer-readable storage medium of claim 6, wherein:
the analyzing characteristics of the user accessing the system comprise modelling the user activities via a collection of data from the plurality of user activity data sources.

8. The non-transitory, computer-readable storage medium of claim 6, wherein:
activity behavioral groups are constructed on a global perspective based upon the user activities of a plurality of users.

9. The non-transitory, computer-readable storage medium of claim 6, wherein:
activity behavioral groups are constructed on an individual perspective based upon user activities of a single user.

10. The non-transitory, computer-readable storage medium of claim 6, wherein:
user activity is associated with one or more user activity attributes, the user activity comprising browsing habits and system access behavior; and
user activities are dynamically clustered depending on a user activity.

11. The non-transitory, computer-readable storage medium of claim 6, wherein the computer executable instructions are deployable to a client system from a server system at a remote location.

12. The non-transitory, computer-readable storage medium of claim 6, wherein the computer executable instructions are provided by a service provider to a user on an on-demand basis.

* * * * *